US005825397A

United States Patent [19]

Fujishiro

[11] Patent Number: 5,825,397

[45] Date of Patent: Oct. 20, 1998

[54] COLOR THERMAL PRINTER AND OPTICAL FIXING DEVICE THEREFOR

[75] Inventor: Takeshi Fujishiro, Saitama, Japan

[73] Assignee: Fuji Photo Film Co., Ltd., Kanagawa, Japan

[21] Appl. No.: 661,732

[22] Filed: Jun. 11, 1996

[30] Foreign Application Priority Data

Jun. 19, 1995 [JP] Japan .................................... 7-152060

[51] Int. Cl.[6] .............................. B41J 2/325; B41J 11/00; G01D 15/10

[52] U.S. Cl. ............................................. 347/212; 347/175

[58] Field of Search ..................................... 347/175, 211, 347/156, 232, 102; 399/320, 336; 400/120.18

[56] References Cited

FOREIGN PATENT DOCUMENTS 63-33321 9/1988 Japan .
4-54590 8/1992 Japan .

*Primary Examiner*—N. Le
*Assistant Examiner*—L. Anderson

[57] ABSTRACT

An optical fixing device of a color thermal printer is used for fixing one of three color developing thermosensitive layers of a color thermosensitive recording medium. A pair of lamps are disposed side by side in a reflector of the optical fixing device, for projecting electromagnetic rays of a specific wavelength range toward the color thermosensitive recording medium. A plurality of apertures are formed through the reflector to provide a light path from each of the lamps to a single photosensor, wherein distances from the lamps to the photosensor are different from each other, and incident angles of the respective light paths onto the photosensor are determined such that the photosensor may receive an equal amount of electromagnetic rays from each of the lamps under the same conditions.

20 Claims, 5 Drawing Sheets

INCIDENT ANGLE

DIRECTIVITY (%)

COLOR THERMAL PRINTER AND OPTICAL FIXING DEVICE THEREFOR

DESCRIPTION OF THE BACKGROUND OF THE INVENTION

1. Field of the Invention

The present invention relates to a color thermal printer for use with a color thermosensitive recording medium, which is provided with a thermal head and at least an optical fixing device. More particularly, the present invention relates to an optical fixing device of a color thermal printer, having a plurality of lamps.

2. Background Art

A color thermal printer for use with a color thermosensitive recording medium has been known. The color thermosensitive recording medium has at least three color thermosensitive layers which develop cyan, magenta and yellow when heated. Because the thermosensitive layers have different thermosensitivities for color, a full color image can be thermally recorded in a frame sequential fashion in order from the most sensitive to the least sensitive layer. After recording a color frame in the most sensitive layer, this layer is optically fixed by electromagnetic rays of a specific wavelength range, so as not to develop color any more. Then, a next color frame is recorded in the second sensitive layer, which is, thereafter, fixed by electromagnetic rays of another wavelength range. Finally, recording in the least sensitive layer is executed to complete a full color image.

A lamp for radiating the electromagnetic rays for fixing is mainly an elongated discharge tube, and is disposed along a transverse direction to a paper transport direction. Because the intensity of light from the lamp changes with the temperature of the tube wall, as described, for example, in JP-Y-63-33321, it is desirable for uniform optical fixing to measure light from the lamp and maintain the light intensity of the lamp to be constant based on the measured light amount, as is disclosed in JP-B-4-54590.

To avoid interference with the light path from the lamp to the recording paper, a photosensor may not be disposed between the lamp and the recording paper. In an optical fixing device wherein two or more lamps of different wavelength ranges are disposed side by side, and are alternatively turned on for fixing a designated one of the three thermosensitive layers, it is desirable to use a single photosensor to measure the light from each lamp. In order to equalize the sensitivity of the photosensor toward these lamps, the photosensor must be located in a center position between the lamps. However, if the photosensor is disposed behind between the lamps, as the light from the lamp is reflected from the recording paper, the reflected light can travel through between the lamps and fall onto the photosensor. Because the intensity of the reflected light varies depending upon the density of the recorded image, the reflected light would adversely affect the accuracy of measurement.

The same problem would arise in those cases where two or more lamps of the same wavelength range are disposed side by side, and where a U-shaped lamp is disposed transversely to the paper transport direction. These configurations have been used for elongating life of the lamps by reducing intensity of each lamp, or for saving time for fixing by duplicating total light amount.

SUMMARY OF THE INVENTION

A prime object of the present invention is to provide an optical fixing device with a plurality of lamps and a single photosensor which can measure illuminance of the lamps with accuracy without being affected by reflection.

Another object of the present invention is to provide a color thermal printer having such an optical fixing device.

According to the present invention, in an optical fixing device of a color thermal printer for use with a color thermosensitive recording medium, having a plurality of lamps which are spaced from one another in a transport direction of the recording medium and extend in parallel in a direction traversing the transporting direction, and a reflector for reflecting electromagnetic rays from the lamps toward the recording medium, a photosensor is located behind the reflector, and a plurality of apertures are formed through the reflector to provide respective light paths from the lamps to the photosensor such that the photosensor may receive an equal amount of electromagnetic rays from each of the lamps under the same conditions.

According to another preferred embodiment, distance between the photosensor and the lamps and incident angles of the light paths on the photosensor are determined such that the photosensor may receive an equal amount of electromagnetic rays from each of the lamps under the same conditions.

According to another preferred embodiment, the size of the apertures are determined such that the photosensor may receive an equal amount of electromagnetic rays from each of the lamps under the same conditions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and advantages of the present invention will become apparent in the following detailed description of the preferred embodiments when read in connection with the accompanying drawings, which are given by way of illustration only and thus are not limitative of the present invention, wherein like reference numerals designates like or corresponding parts throughout the several views, and wherein.

DETAILED DESCRIPTION OF THE PREFERRED EMBODIMENTS

Figure 1:
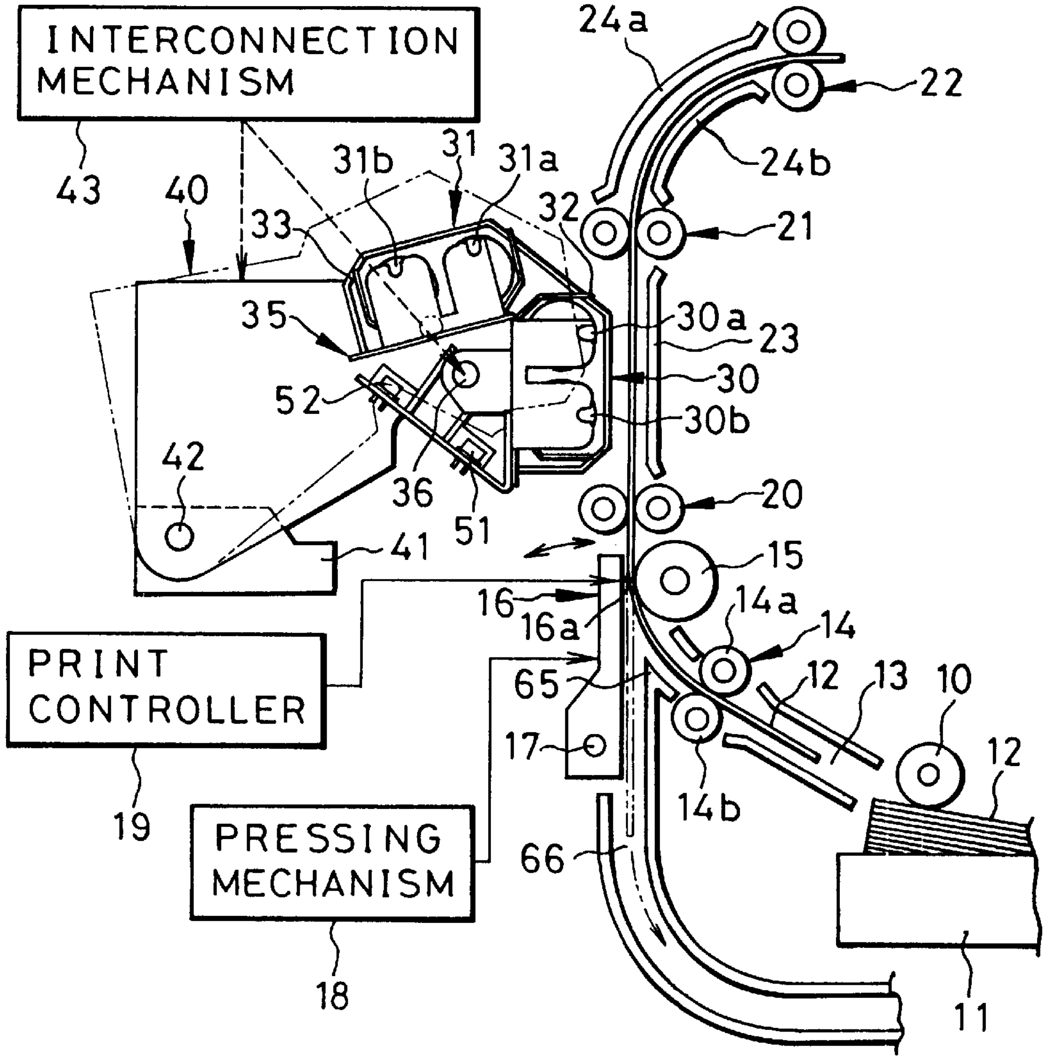
FIG. 1 is a schematic diagram illustrating essential parts of a color thermal printer with optical fixing devices according to a preferred embodiment of the invention.

In a color thermal printer shown in FIG. 1, a sheet of color thermosensitive recording medium 12, hereinafter referred to as a recording paper 12, is fed out by a paper feed roller 10 from a supply tray 11, and is transported through a passage way 13 to a first pair of transport rollers 14. The transport rollers 14 are constituted by a drive roller 14*a* and a nip roller 14*b* to nip and transport the recording paper 12 toward a platen roller 15 and a thermal head 16.

Behind the platen roller 15 and the thermal head 16, there are second, third and fourth pairs of transport rollers 20, 21 and 22, and guide plates 23, 24*a* and 24*b*. Each pair of transport rollers are also constituted by a drive roller and a nip roller.

The thermal head 16 has an array of heating elements 16*a* arranged in a conventional manner, and is pivotally supported on a shaft 17. Thus a head pressing mechanism 18 can move the thermal head 16 between a rest position retracted away from the platen roller 15 and an operating position contacting the heating elements 16*a* on the platen roller 15 and accordingly on the recording paper 12 passing through between the platen roller 15 and the thermal head 16. The thermal head 16 is under the control of a print controller 19, which includes three color frame memory for storing image data by color and drives the heating elements 16*a* in accordance with the image data to record a full-color image at desired densities according to a frame sequential fashion.

Figure 2:
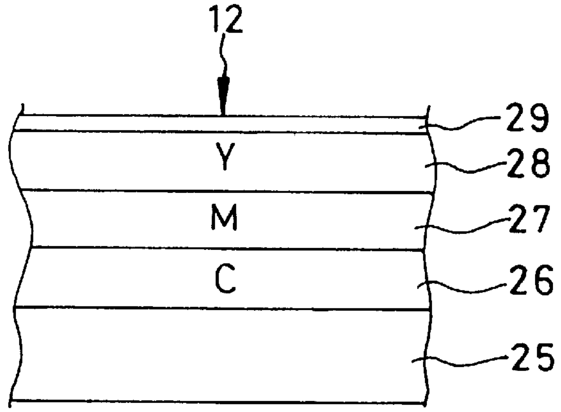
FIG. 2 is a schematic sectional view illustrating a layered structure of a color thermosensitive recording medium.

The recording paper 12 has a multi-layered construction as shown in FIG. 2, wherein a cyan developing thermosensitive layer 26, a magenta developing thermosensitive layer 27, a yellow developing thermosensitive layer 28, and a protection layer 29 are formed on a base material 25 in this order from the base material 25. The base material 25 may be an opaque coated paper or a plastic film, but may be a transparent plastic film to make a print for use on an over-head projector. The frame sequential recording is performed from the yellow to cyan developing thermosensitive layers 28 to 26, that is, in the order from the obverse of the recording paper 12. These thermosensitive layers 26 to 28 are not necessarily arranged in the order shown in FIG. 2, and the sequence of frame recording varies according to the order of the thermosensitive layers from the obverse.

The cyan developing thermosensitive layer 26 contains an electron donating dye precursor and an electron accepting compound as main components, and is colored cyan when it is heated. The magenta developing thermosensitive layer 27 contains a diazonium salt compound having a maximum absorption factor at a wavelength of about 365 nm and a coupler which acts upon the diazonium salt compound and is colored magenta when it is heated. The magenta developing thermosensitive layer 27 loses its coloring ability when exposed to electromagnetic rays of about 365 nm. The yellow developing thermosensitive layer 28 contains a diazonium salt compound having a maximum absorption factor at a wavelength of about 420 nm and a coupler which acts upon the diazonium salt compound and is colored yellow when it is heated. The yellow developing thermosensitive layer 28 loses its coloring ability when exposed to electromagnetic rays of about 420 nm.

As shown in FIG. 1, first and second optical fixing devices 30 and 31 are supported to be alternatively placed in a fixing position facing the guide plate 23 between the second and third pairs of transport rollers 20 and 21. Specifically, the fixing position of the optical fixing devices 30 and 31 is located closer to the second pair of transport rollers 20, so as to minimize unsatisfactory fixed or unfixed margin of the recording paper 12. The first optical fixing device 30 is constituted of a pair of lamps 30*a* and 30*b* and a reflector 32 for reflecting electromagnetic rays from the lamps 30*a* and 30*b* toward the recording paper 12 on the guide plate 23. The second optical fixing device 31 is constituted of a pair of lamps 31*a* and 31*b* and a reflector 33 for reflecting electromagnetic rays from the lamps 31*a* and 31*b* toward the recording paper 12 on the guide plate 23. The electromagnetic rays from the lamps 30*a* and 30*b* of the first optical fixing device 30 has a peak at about 420 nm for fixing the yellow developing thermosensitive layer 28. The electromagnetic rays from the lamps 31*a* and 31*b* of the second optical fixing device 31 has a peak at about 365 nm for fixing the magenta developing thermosensitive layer 27.

The optical fixing devices 30 and 31 are mounted to a supporting member 35 which is rotatable about a rotary shaft 36 by 105 degrees so that one of the optical fixing devices 30 and 31 is placed in the fixing position facing the guide plate 23. The rotary shaft 36 of the supporting member 35 is supported rotatable on a main body 40. The main body 40 is supported on a stay 41 through a shaft 42 to be rotatable through an angle of 10 degrees between a position shown by solid lines and a rest position shown by phantom lines. The main body 40 and the supporting member 35 are interconnected to each other through an interconnection mechanism 43, such that the supporting member 35 is rotated by 105 degrees while the main body 40 is set in the rest position.

Figure 3A:
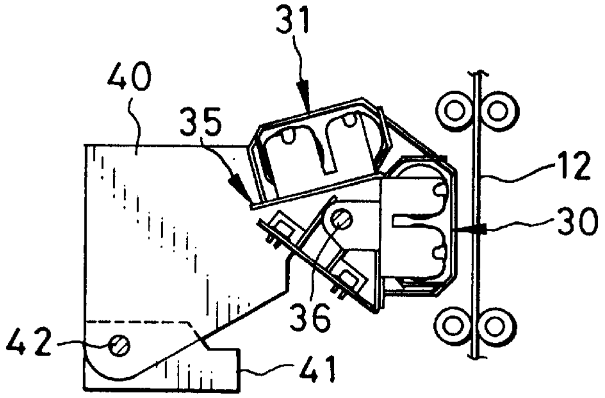
FIGS. 3A, 3B, 3C and 3D are explanatory views illustrating a switching operation between the optical fixing devices.
Figure 3B:
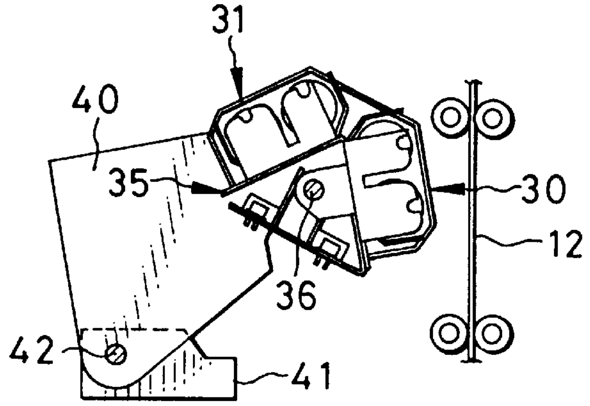
Figure 3C:
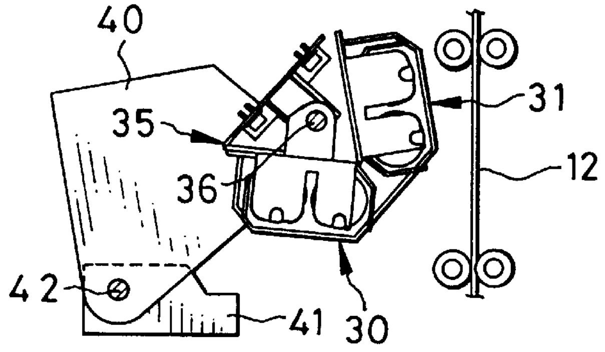
Figure 3D:
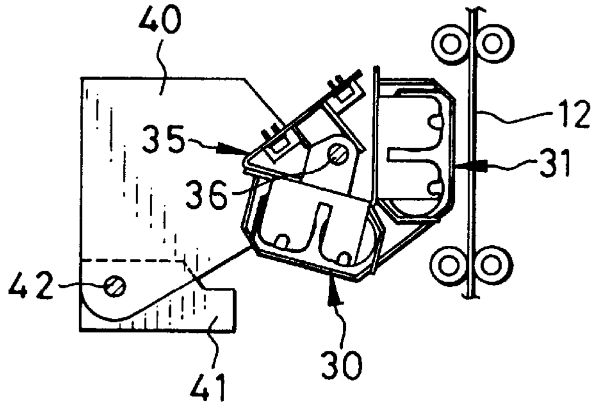

The interconnection mechanism 43 is constituted of a motor, a gear train, a clutch and so forth, although they are not shown in the drawings. FIGS. 3A to 3D illustrate the operation of the interconnection mechanism 43. The main body 40 is rotated by 10 degrees in a counterclockwise direction from the position shown in FIG. 3A, that is the yellow fixing position in this instance, to the rest position shown in FIG. 3B. Then, the supporting member 35 is rotated clockwise by 105 degrees, as shown in FIG. 3C. Thereafter, the main body 40 is rotated clockwise by 10 degrees to return to the initial position. As a result, the second optical fixing device is placed in the fixing position as shown in FIG. 3D. When switching from the magenta fixing position to the yellow fixing position, the main body 40 and the supporting device 35 are rotated in reverse order, i.e., from FIG. 3D to 3A. The interconnection mechanism 43 may be controlled by cams and links, or electromagnetic clutch brakes or the like.

Figure 4:
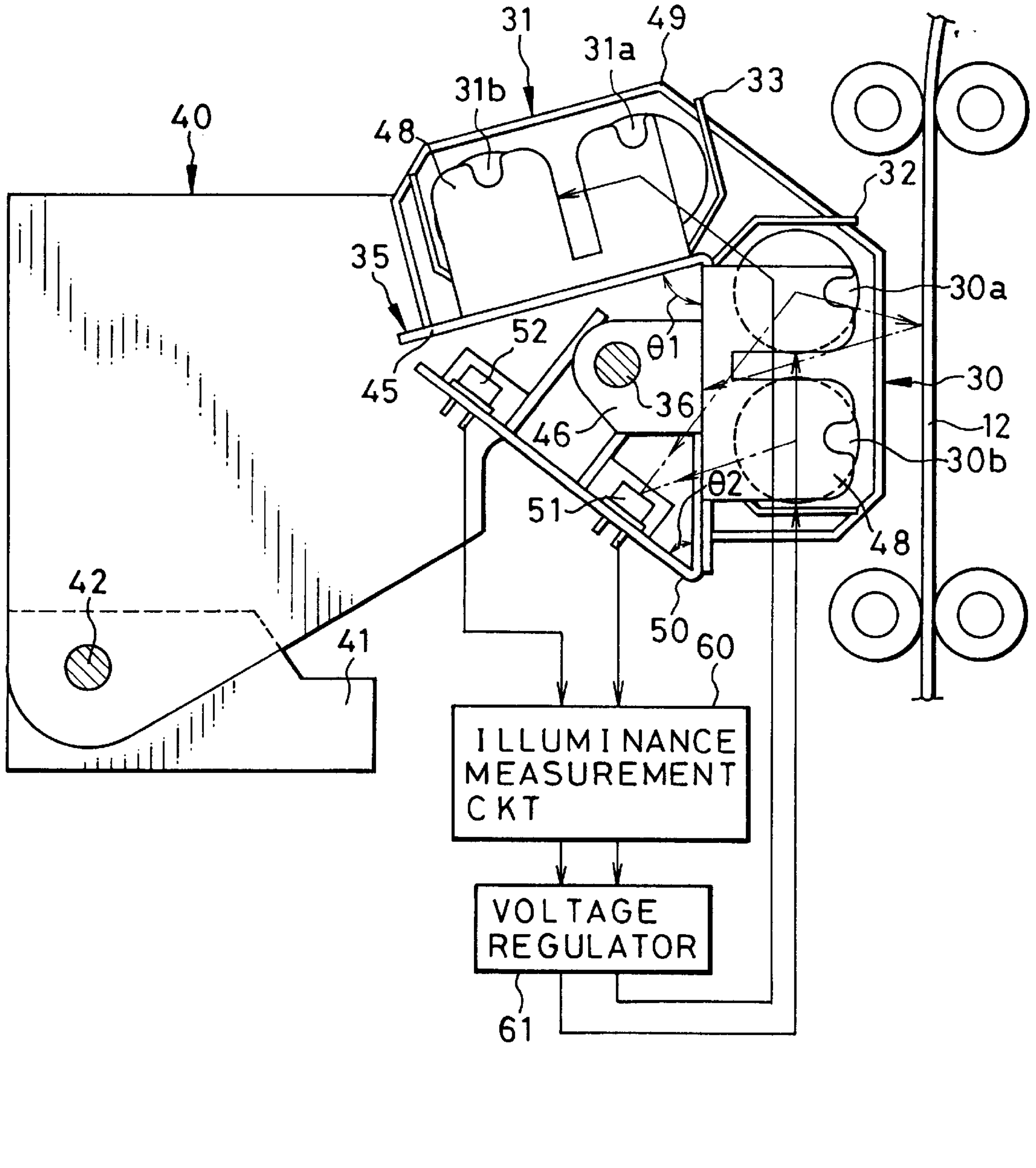
FIG. 4 is an enlarged side view of the optical fixing devices in a yellow fixing position and photosensors for measuring illuminance of the lamps.

As shown in FIG. 4, the supporting member 35 is constituted by a bracket base 45 which is bent at an angle $\theta 1$ of 75 degrees, a base pivoting portion 46 and lamp brackets 48 which are formed as an integral body with the bracket base 45. However, the two sides of the V-shaped bracket base 45 may be constituted by a pair of separate base plates which are rotatable together about the rotary shaft 36. The reflectors 32 and 33 are attached to the bracket base 45 on the opposite sides thereof. The lamp brackets 48 have contact blades (not-shown) for supporting contact pins (not-shown) of the lamps 30*a*, 30*b*, 31*a* and 31*b*, in a conventional manner. Thus, each pair of the lamps 30*a*, 30*b* and 31*a*, 31*b* are supported side by side in the respective reflectors 32 and 33.

The base pivoting portion 46 is secured to the rotary shaft 36 such that the two sides of the V-shaped bracket base 45 are rotationally symmetric about an axis of the rotary shaft 36, so the first and second optical devices 30 and 31 mounted on the bracket base 45 are rotationally symmetric about the axis of the rotary shaft 36. That is, the lamps 30*a*, 30*b*, 31*a* and 31*b* extend in parallel with and are spaced radially equally from the rotary shaft 36. Also, lamp covers 49 are mounted to the supporting member 35 on opposite ends of the reflectors 32 and 33, to cover end portions of the lamps 30*a*, 30*b*, 31*a* and 31*b*.

A sensor base 50 is secured to the supporting member 35 on the rear side of the reflectors 32 and 33 from the lamps 30*a*, 30*b*, 31*a* and 31*b*. The sensor base 50 is a V-shaped plate bent at an angle θ2 of 52.5 degrees, and one side of which is secured to the bracket base 45 to form a substantially isosceles triangle. A pair of photosensors 51 and 52 are mounted on the other side of the V-shaped sensor base 50 on opposite sides of a bisector of the triangle. According to this configuration, if electromagnetic rays reflected from the recording paper 12 travel through between the lamps 30*a* and 30*b*, as shown by a phantom line in FIG. 4, the reflected rays would not reach the photosensor 51. The photosensor 51 may only receive the electromagnetic rays directly from the lamps 30*a* and 30*b*, as shown by chain-dotted lines in FIG. 4. The same applies to the photosensor 52.

Figure 5:
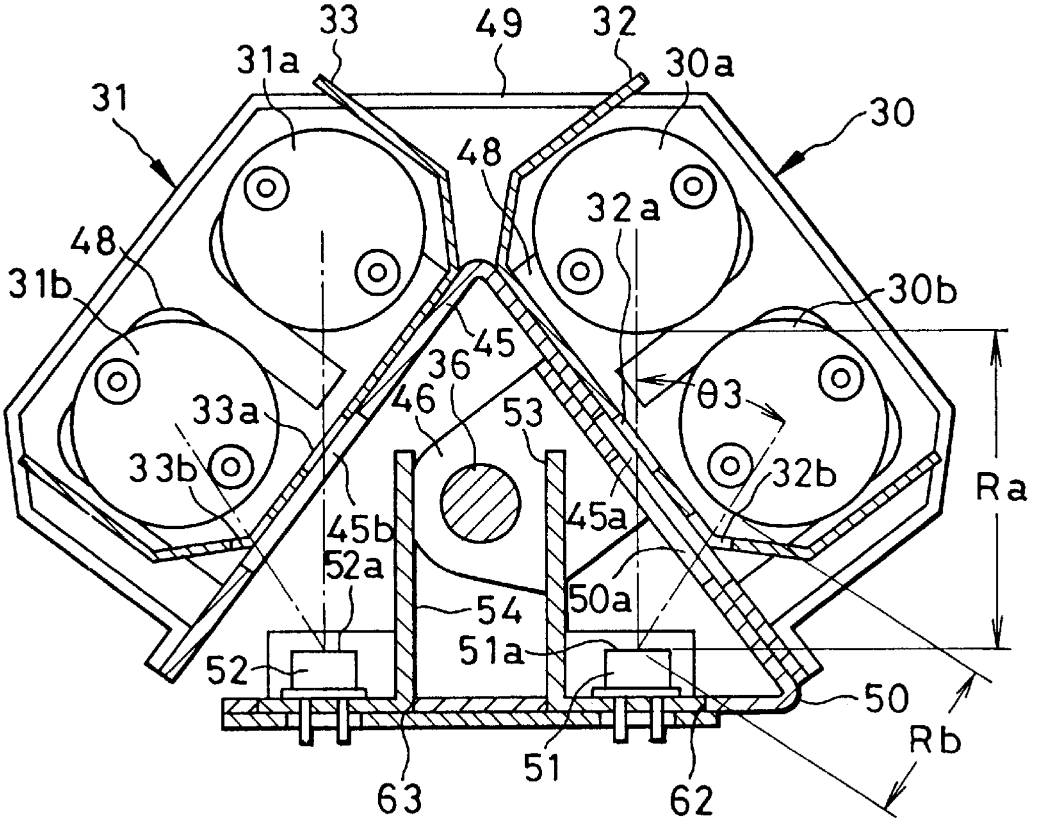
FIG. 5 is an explanatory view illustrating the relationship between the lamps and the photosensors.

As shown in FIG. 5, there are light apertures 32*a*, 32*b*, 45*a* and 50*a* formed respectively through the reflector 32, the bracket base 45 and the sensor base 50. The light apertures 32*a*, 45*a* and 50*a* are in a light path from the lamp 30*a* to the photosensor 51, whereas the light apertures 32*b*, 45*a* and 50*a* are in a light path from the lamp 30*b* to the photosensor 51. On the other hand, light apertures 33*a*, 33*b*, 45*b* are formed through the reflector 33 and the bracket base 45. The light apertures 33*a* and 45*b* are in a light path from the lamp 31*a* to the photosensor 52, and the light apertures 33*b* and 45*b* are in a light path from the lamp 31*b* to the photosensor 52. Because the photosensors 51 and 52 are displaced from a range where light reflected from the recording paper 12 may enter through the light apertures 32*a*, 32*b*, 45*a* and 50*a*; or 33*a*, 33*b* and 45*b* perpendicularly to either side of the bracket base 45, the reflected light will not affect the photosensors 51 and 52.

Shielding plates 53 and 54 are mounted to the sensor base 50 between the photosensors 51 and 52 and the rotary shaft 36, so that wires of the lamps 30*a*, 30*b*, 31*a* and 31*b* or other elements may not interfere with the light paths from the lamps to the photosensors 51 and 52.

The photosensors 51 and 52 may be well-known phototransistors which photo-electrically convert light from the lamps 30*a*, 30*b*, 31*a* and 31*b* into electric signals. The photo-electric signals from the photosensors 51 and 52 are sent to an illuminance measurement circuit 60 as shown in FIG. 4. The illuminance measurement circuit 60 generates illuminance signals from the photo-electric signals. Based on the illuminance signals, a voltage regulator 61 regulates drive voltages to the lamps 30*a*, 30*b*, 31*a* and 31*b*, so as to control the intensity of the lamps 30*a*, 30*b*, 31*a* and 31*b* and thus the illuminance on the recording paper 12 constant and uniform.

As shown in FIG. 5, the photosensors 51 and 52 are fitted in holes 62 and 63 formed through the sensor base 50. The photosensor 51 and 52 are arranged such that light from the lamp 30*a* or 31*a*, which is farther than the lamp 30*b* or 31*b* from the photosensor 51 or 52, falls on a light receiving surface 51*a* or 52*a* of the photosensor 51 or 52 at an incident angle of zero, respectively. The nearer lamp 30*b* of the first optical fixing device 30 to the photosensor 51 is arranged such that light from the lamp 30*b* falls on the light receiving surface 51*a* of the photosensor 51 at an incident angle θ3 of 30 degrees, as shown in FIG. 5. Distances Ra and Rb of the farther lamp 30*a* and the nearer lamp 30*b* from the light receiving surface 51*a* of the photosensor 51 are defined according to an equation, as set forth below. By arranging the photosensors 51 in this way relative to the lamps 30*a* and 30*b*, the single photosensor 51 can equally detect the variation of illuminance of the respective lamps 30*a* and 30*b*.

Also, the nearer lamp 31*b* of the second optical fixing device 31 to the photosensor 52 is arranged such that the light from the lamp 31*b* falls on the light receiving surface 52*a* of the photosensor 52 at an incident angle of 30 degrees. Distances of the lamps 31*a* and 31*b* from the light receiving surface 52*a* are defined in the same way as for the first optical fixing device 30.

Figure 6:
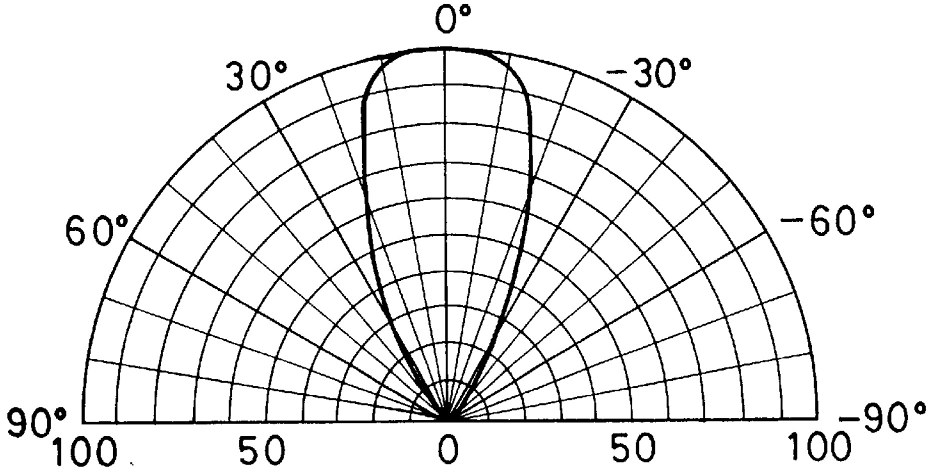
FIG. 6 is a diagram illustrating a directivity of the photosensor.

FIG. 6 shows a directivity of the photosensors 51 and 52 used in the present embodiment, which shows a curve of illuminance with respect to incident angle onto the light receiving surface 51*a* or 52*a* of the photosensor 51 or 52, expressed as percentages of a maximum illuminance at an incident angle of zero. As shown in FIG. 6, the sensitivity at an incident angle of 30 degrees is 25% of that at an incident angle of zero. Accordingly, the lamp 30*b* is located closer than the lamp 30*a* to the light receiving surface 51*a* so as to compensate for the 75% lower sensitivity toward light from the lamp 30*b*. In this way, illuminance of the lamps 30*a* and 30*b* can be measured by the single photosensor 51 in the substantially same condition.

The distances Ra and Rb may be calculated according to the following equations based on luminance of the lamps 30*a* and 30*b*, and incident angle θ on the light receiving surface 51*a* so as to equalize the illuminance of the lamps 30*a* and 30*b* on the light receiving surface 51*a*. However, it is preferable, for more accurate measurement of the illuminance variation, to define the distances Ra and Rb by experiments with different combinations of distances Ra and Rb and incident angle θ, so as to equalize the measuring condition on the light receiving surface 51*a* toward the lamps 30*a* and 30*b*.

Because it can be assumed that the lamps 30*a* and 30*b* have the same luminance "L"(cd/m$^2$), the illuminance "dEa" of the lamp 30*a* on the light receiving surface 51*a* with the incident angle of zero may be given as follows:

$$dEa = L/Ra^2 \quad (1)$$

On the other hand, according the directivity of the photosensor 51 as shown in FIG. 6, because light from the lamp 30*b* falls with the incident angle of 30 degrees on the light receiving surface 51*b*, a relative illuminance "dEb" of the lamp 30*b* to the lamp 30*a* on the light receiving surface 51*a* may be given as follows $$dEb = 0.25 \times L/Rb^2 \quad (2)$$

To equalize the illuminances "dEa" and "dEb" of the lamps 30*a* and 30*b*, the following equation is useful:

$$L/Ra^2 = 0.25 \times L/Rb^2 \quad (3)$$

From the equation (3), the following equation may be derived:

$$Rb = \sqrt{0.25} \times Ra = 0.5 \times Ra \quad (4)$$

Consequently, the distances Ra and Rb of the lamps 30*a* and 30*b* to the light receiving surface 51*a* should be determined to be Ra:Rb=2:1 in this embodiment.

The above-described color thermal printer operates as follows:

In response to a print start switch being actuated, a topmost sheet of recording paper 12 piled in the supply tray 11 is fed out by the paper feed roller 10 toward the first pair of transport rollers 14. When the recording paper 12 is nipped between the transport rollers 14, the paper feed roller 10 stops feeding.

The transport rollers 14 transport the recording paper 12 through between the platen roller 15 and the thermal head 16. After a leading end of the recording paper 12 is nipped between the second pair of transport rollers 20, when the recording paper 12 moves in a predetermined position, then the head pressing mechanism 18 rotates the thermal head 16 in the clockwise direction in FIG. 1 to bring the heating elements 16*a* into contact with the recording paper 12. Thereafter, the first pair of transport rollers 14 release the recording paper 12.

Thus, the recording paper 12 is transported further in a forward direction through the second to fourth pairs of transport rollers 20 to 22, while the thermal head 16 records a yellow frame line by line in the yellow developing thermosensitive layer 28 by driving the heating elements 16*a* in accordance with yellow frame image data in a conventional manner. Synchronously with the yellow frame recording, the lamps 30*a* and 30*b* of the first optical fixing device 30 are turned on to project electromagnetic rays of about 420 nm toward the recording paper 12 guided along the guide plate 23, thereby fixing the yellow developing thermosensitive layer 28.

When the yellow frame has been recorded and fixed, where a trailing end of the recording paper 12 in the forward direction is nipped by the second pair of transport rollers 20, the thermal head 16 is moved back to the rest position, and the second to fourth pairs of transport rollers 20 to 22 pause for a moment. Then, the second to fourth pairs of transport rollers 20 to 22, start rotating reversely to transport the recording paper 12 in a backward direction. At that time, the trailing end of the recording paper 12 is guided by a guide edge 65 to a backward passageway 66, as shown by phantom lines in FIG. 1.

While the recording paper 12 is transported backward, the interconnection mechanism 43 operates to replace the first optical fixing device 30 with the second optical fixing device 31 in the manner as described with reference to FIGS. 3A to 3D.

Thereafter when the predetermined position in the leading end of the recording paper 12 again reaches to the heating elements 16*a*, the second to fourth pairs of transport rollers 20 to 22 pause for a moment, and the thermal head 16 is set to the operating position again. Then, the second to fourth pairs of transport rollers 20 to 22 are rotated in the initial direction to transport the recording paper 12 forwardly. The thermal head 16 records a magenta frame line by line in the magenta developing thermosensitive layer 27 in the same way as for the yellow frame recording, while the recording paper 12 is transported forwardly.

At that time, the yellow developing thermosensitive layer 28 would not develop color responsive to the heat for the magenta developing, because of being fixed by the first optical fixing device 30. Because thermosensitivity of the cyan developing thermosensitive layer 26 is still lower than that of the magenta developing thermosensitive layer 27, cyan would not be developed responsive to the heat applied for magenta developing. Synchronously with the magenta frame recording, the lamps 31*a* and 31*b* of the second optical fixing device 31 are turned on to project electromagnetic rays of about 365 nm toward the recording paper 12 guided along the guide plate 23, thereby fixing the magenta developing thermosensitive layer 27.

When the magenta frame has been completely recorded and fixed, the thermal head 16 is set back to the rest position again, and the second to fourth pairs of transport rollers 20 to 22 are stopped and then rotated reversely to move the recording paper 12 back to the predetermined position for starting recording a cyan frame.

The cyan frame recording is performed in the same way as for the other colors. Throughout the cyan frame recording, the lamp 31*a* and/or the lamp 31*b* projects electromagnetic rays for bleaching the recording paper 12.

When the three color frames have been recorded in this way, the rollers 20 to 22 continue rotating to transport the recording paper 12 forwardly to eject the recording paper 12 through an ejection passageway. On the other hand, the main body 40 and the supporting member 35 are rotated in reverse order as shown from FIG. 3D to 3A, to set the first optical fixing device 30 in the fixing position in place of the second optical fixing device 31.

If the illuminance of any one of the lamps 30*a*, 30*b*, 31*a* and 31*b* changes for some reason, the illuminance measurement circuit 60 detects it through the photosensor 51 or 52, and controls drive voltages to the lamps 30*a*, 30*b*, 31*a* and 31*b* through the voltage regulator 61 so as to maintain the illuminance of the lamps 30*a*, 30*b*, 31*a* and 31*b* constant. Because the photosensor 51 is positioned such that the illuminances of the lamps 30*a* and 30*b* on the light receiving surface 51*a* may be equal to each other so long as the intensities of the lamps 30*a* and 30*b* are equal to each other, the single photosensor 51 can detect the variation of illuminance of the lamps 30*a* and 30*b* with accuracy. The same applies to the photosensor 52 in relation to the lamps 31*a* and 31*b*.

Because the photosensors 51 and 52 are displaced from the range where light reflected from the recording paper 12 may enter through the light apertures 32*a*, 32*b*, 45*a* and 50*a*; or 33*a*, 33*b* and 45*b*, the photosensors 51 and 52 are not affected by the reflected light. Also when any of the lamps 30*a*, 30*b*, 31*a* and 31*b* are deteriorated or broken down, the photosensors 51 and 52 can reliably detect such a failure. The main body 40 is rotatable also in the counterclockwise direction by an angle of about 45 degrees, so that it is easy to exchange the defective lamp with a new one.

Figure 7:
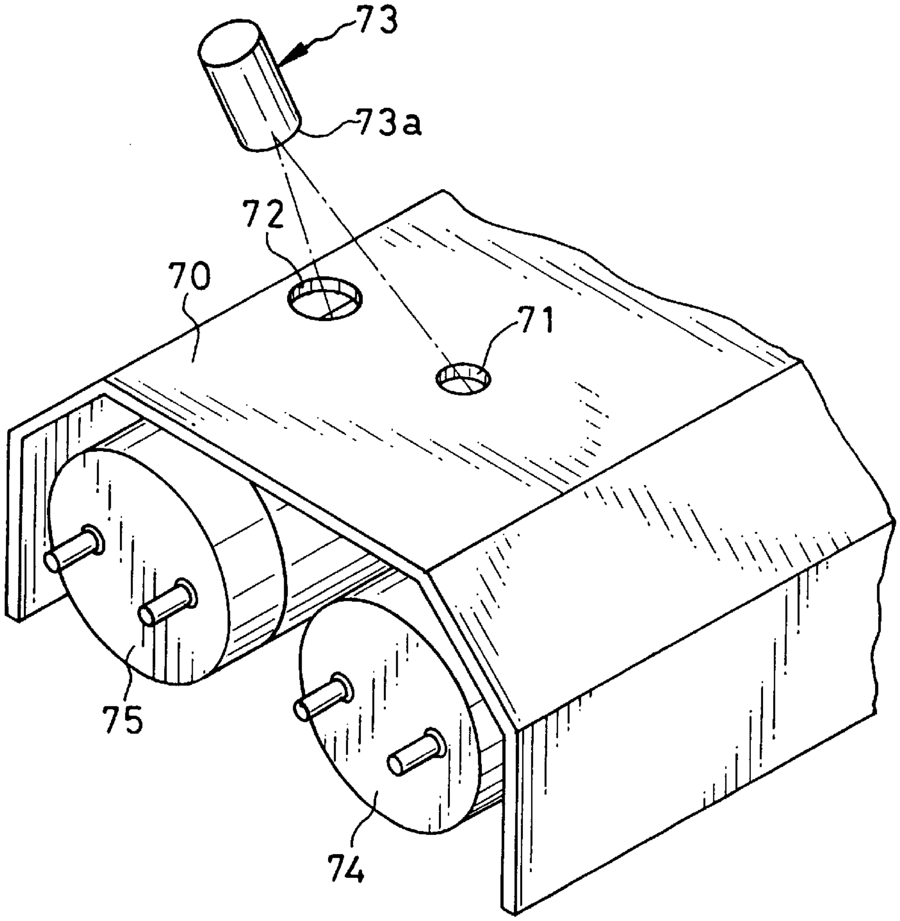
FIG. 7 is an explanatory view of an optical fixing device according to another preferred embodiment of the invention.

Instead of, or, in addition to changing the distances Ra and Rb of the lamps of each optical fixing device 30 or 31 in accordance with incident angle on the light receiving surface 51*a* or 52*a* of the photosensor 51 or 52, it is possible to change the size of two light apertures 71 and 72 of a reflector 70 of an optical fixing device such that the illuminances of two lamps 74 and 75 of the optical fixing device are equal to each other on a light receiving surface 73*a* of a photosensor 73, as is shown in FIG. 7.

Although the first and second optical fixing devices 30 and 31 are replaced with each other by rotating the supporting member 35 and the main body 40 in cooperation with each other in the above embodiment, it is possible to replace the fixing devices 30 and 31 with each other merely by rotating the supporting member 35. But this configuration requires a larger space. It is also possible to use a shift mechanism instead of the supporting member 35.

The angles $\theta 1$ and $\theta 2$ may be changed so long as the first and second optical fixing devices 30 and 31 are rotationally symmetric about the rotary shaft 36. In that case, the incident angles of the light paths onto the photosensors 51 and 52, as well as the distances Ra and Rb, should be changed correspondingly.

Furthermore, each optical fixing device 30 or 31 may have more than two lamps. Also in those cases, the incident angles and the distances of the lamps to a photosensor and, if necessary, the size of light apertures through a reflector should be determined such that the photosensor may receive an equal amount of electromagnetic rays from each of the lamps under the same conditions, that is, the illuminances of the lamps on the photosensor are equal so long as the lamps have the same luminance or intensity.

It is possible to transport the recording paper 12 along a horizontal path, although the recording paper 12 is transported along a vertical path in the embodiment shown in the drawings.

Figure 8:
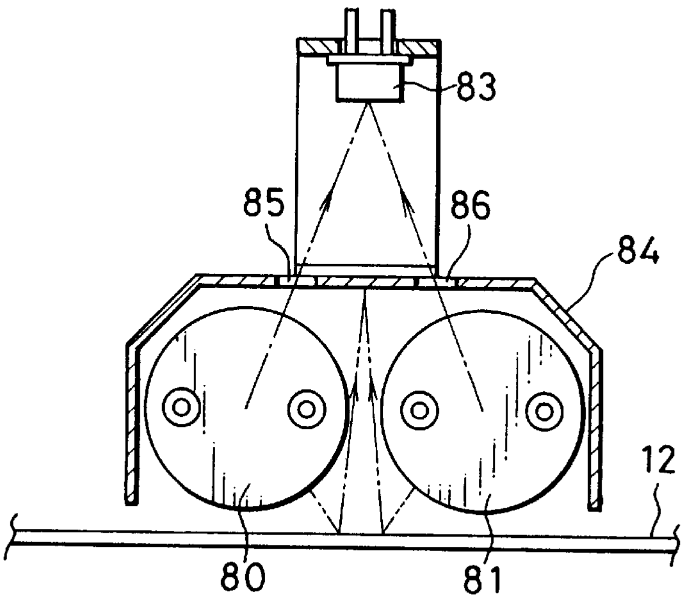
FIG. 8 is an explanatory view of an optical fixing device according to a further preferred embodiment of the invention.

In case of a color thermal printer having optical fixing devices in respective stationary positions, it is unnecessary to provide a rotatable supporting member like the supporting member 35, so that interference would not occur between photosensors and a rotary shaft of the supporting member. Accordingly, it is possible to locate a photosensor 83 at the same distance from a pair of lamps 80 and 81 of the stationary optical fixing device, so as to receive light from the lamps 80 and 81 at the same incident angle, as shown in FIG. 8.

For this configuration, light apertures 85 and 86 should be formed through a reflector 84 in positions disposed in respective light paths from the photosensor 83 to the lamps 80 and 81. The size of the light apertures 85 and 86 should be so small that light reflected from the recording paper 12 may not pass through the light apertures 85 and 86 into the photosensor 83. Thus, the photosensor 83 can reliably measure the illuminance of the lamps 80 and 81, without being affected by the density of the image recorded on the recording paper 12.

The present invention is applicable to a color thermal printer wherein the recording paper is fitted on a periphery of a relatively large platen drum to transport the recording paper circularly, and a thermal head and at least an optical fixing device are disposed along the periphery of the platen drum.

The present invention is also applicable to an optical fixing device having two lamps which are disposed side by side, and are alternatively turned on to radiate electromagnetic rays of either a first wavelength range specific to fixing a color developing thermosensitive layer, or a second wavelength range specific to fixing a second color developing thermosensitive layer.

Although the present invention has bee described with respect to preferred embodiments shown in the drawings, the present invention should not be limited to these embodiments but, on the contrary, various modifications may be possible to those skilled in the art without departing from the scope of appended claims.

What is claimed is:

1. An optical fixing device of a color thermal printer for use with a color thermosensitive recording medium having at least three color developing thermosensitive layers, the optical fixing device projecting electromagnetic rays of a wavelength range specific to fixing one of the three color developing thermosensitive layers, the optical fixing device comprising:

a plurality of lamps for radiating the electromagnetic rays, the lamps being spaced from one another;

a reflector for reflecting the electromagnetic rays toward the color thermosensitive recording medium;

a photosensor located behind the reflector for detecting the electromagnetic rays;

a plurality of apertures, formed through the reflector, providing a light path from each of the plurality of lamps to the photosensor, the plurality of apertures having sizes such that the photosensor receives an equal amount of electromagnetic rays from each of the plurality of lamps when power supplied to each of the plurality of lamps is the same; and a control device for controlling the power supplied to the plurality of lamps in accordance with a photo-electric signal from the photosensor.

2. An optical fixing device of a color thermal printer for recording a full-color image on a color thermosensitive recording medium having at least three color developing thermosensitive layers, the optical fixing device projecting electromagnetic rays of a wavelength range specific to fixing one of the three color developing thermosensitive layers, the optical fixing device comprising:

a plurality of lamps for radiating the electromagnetic rays, the lamps being spaced from one another;

a reflector for reflecting the electromagnetic rays toward the color thermosensitive recording medium;

a photosensor located behind the reflector for detecting the electromagnetic rays;

a plurality of apertures, formed through the reflector, providing a light path from each of the plurality of lamps to the photosensor, distances from the plurality of lamps to the photosensor and incident angles of the respective light paths onto the photosensor being determined such that the photosensor receives an equal amount of electromagnetic rays from each of the plurality of lamps when power supplied to each of the plurality of lamps is the same; and a control device for controlling the power supplied to the plurality of lamps in accordance with a photo-electric signal from the photosensor.

3. The optical fixing device as claimed in claim 2, wherein the plurality of apertures have different sizes.

4. The optical fixing device as claimed in claim 2, wherein the distances from the plurality of lamps to the photosensor are different such that the photosensor is located out of a range directly behind a space between two adjacent lamps of the plurality of lamps.

5. The optical fixing device as claimed in claim 2, wherein the apertures are formed in portions of the reflector out of a range of electromagnetic rays reflected from the color thermosensitive recording medium.

6. A color thermal printer for printing a full-color image on a color thermosensitive recording medium having at least first to third thermosensitive layers, the color thermal printer comprising:

a thermal head for thermally recording at least first to third color frames of the full-color image in the at least first to third thermosensitive layers frame sequentially;

a transport system for transporting the color thermosensitive recording medium past the thermal head synchronously during recording by the thermal head;

a first optical fixing device having a plurality of first lamps for projecting first electromagnetic rays to fix the first thermosensitive layer after the first color frame is recorded in the first thermosensitive layer, the first optical fixing device also having a first reflector for reflecting the first electromagnetic rays toward the color thermosensitive recording medium, the plurality of first lamps being spaced from one another;

a second optical fixing device having a plurality of second lamps for projecting second electromagnetic rays to fix the second thermosensitive layer after the second color frame is recorded in the second thermosensitive layer, the second optical fixing device also having a second reflector for reflecting the second electromagnetic rays toward the color thermosensitive recording medium, the plurality of second lamps being spaced from one another;

a supporting member supporting the first and second optical fixing devices, the supporting member being rotatable about a rotary shaft to place the first and second optical fixing devices alternatively in a fixing position facing the color thermosensitive recording medium;

a first photosensor located behind the first reflector of the first optical fixing device;

a second photosensor located behind the second reflector of the second optical fixing device;

a plurality of first apertures formed through the first reflector providing a light path from each of the plurality of first lamps to the first photosensor and a plurality of second apertures formed through the second reflector providing a light path from each of the plurality of second lamps to the second photosensor, distances from the plurality of first lamps to the first sensor or distances from the plurality of second lamps to the second photosensor and incident angles of the respective light paths onto the first or the second photosensors being determined such that the first or the second photosensors respectively receive an equal amount of electromagnetic rays from each of the plurality of first lamps and each of the plurality of second lamps when power supplied to each of the plurality of first lamps and the plurality of second lamps are respectively the same; and a control device for controlling the power supplied to the plurality of first and second lamps in accordance with photo-electric signals from the first and the second photosensors, respectively.

7. The color thermal printer as claimed in claim 6, wherein the plurality of first and second apertures have different sizes.

8. The color thermal printer as claimed in claim 6, wherein the distances from the plurality of first lamps to the first photosensor or the distances from the plurality of second lamps to the second photosensor are respectively different such that the first or the second photosensors are respectively located out of a range directly behind a space between two adjacent lamps of the plurality of first lamps and a space between two adjacent lamps of the plurality of second lamps.

9. The color thermal printer as claimed in claim 6, wherein the plurality of first apertures or the plurality of second apertures are respectively formed in portions of the first or the second reflectors out of range of the first and second electromagnetic rays respectively reflected from the color thermosensitive recording medium.

10. The color thermal printer as claimed in claim 6, wherein the supporting member comprises first and second base portions forming an angle of less than 180 degrees, the first and second base portions being rotationally symmetric about the rotary shaft and being rotatable together about the rotary shaft, the first and second optical fixing devices being supported respectively on the first and second base portions and being rotationally symmetric with respect to each other about the rotary shift.

11. The color thermal printer as claimed in claim 10, further comprising a sensor base for supporting the first and second photosensors, the sensor base being secured to the supporting member and forming an isosceles triangle with the first and second base portions, apertures being formed through the first and second base portions in the respective light paths from the plurality of first and second lamps to the first and second photosensors.

12. The color thermal printer as claimed in claim 11, wherein the incident angle of a longest light path onto the first or the second photosensors is zero.

13. The color thermal printer as claimed in claim 10, wherein the angle between the first and second base portions is less than 90 degrees.

14. An optical fixing device of a color thermal printer for recording a full-color image on a color thermosensitive recording medium having at least first to third color developing thermosensitive layers, the optical fixing device comprising:

a first lamp for radiating electromagnetic rays of a first wavelength range specific to fixing the first color developing thermosensitive layer;

a second lamp for radiating electromagnetic rays of a second wavelength range specific to fixing the second color developing thermosensitive layer, the second lamp extending parallel to the first lamp and being spaced from the first lamp;

a reflector for reflecting the electromagnetic rays from the first or the second lamp toward the color thermosensitive recording medium;

a photosensor located behind the reflector for detecting the electromagnetic rays;

a plurality of apertures formed through the reflector providing a light path from each of the first and second lamps to the photosensor, distances from the first and second lamps to the photosensor and incident angles of the respective light paths onto the photosensor being determined such that the photosensor receives an equal amount of electromagnetic rays from each of the first and second lamps when power supplied to the first and second lamps are the same; and a control device for controlling the power supplied to the first or the second lamps in accordance with a photoelectric signal from the photosensor.

15. The optical fixing device as claimed in claim 14, wherein the apertures have different sizes.

16. The optical fixing device as claimed in claim 14, wherein the distances from the first and second lamps to the photosensor are different such that the photosensor is located out of a range directly behind a space between the first and second lamps.

17. The optical fixing device as claimed in claim 14, wherein the apertures are formed in portions of the reflector out of a range of electromagnetic rays reflected from the color thermosensitive recording medium.

18. An optical fixing device for a color thermal printer comprising:

at least first and second lamps for radiating electromagnetic rays on a color thermosensitive recording medium;

a reflector for reflecting the electromagnetic rays toward the color thermosensitive medium, said reflector having a plurality of apertures of different sizes formed therein;

a photosensor, located behind said reflector, for detecting the electromagnetic rays radiated from said at least first and second lamps through the plurality of apertures; and control means, coupled to said photosensor, for controlling power supply to said at least first and second lamps in accordance with a photoelectric signal from said photosensor.

19. The optical fixing device of claim 18, wherein sizes of the plurality of apertures are determined such that said photosensor receives an equal amount of electromagnetic rays from said at least first and second lamps when the power supplied to said at least first and second lamps is the same.

20. The optical fixing device of claim 18, wherein said at least first and second lamps are spaced apart, said photosensor being positioned behind said reflector such that no electromagnetic rays reflected from the color thermosensitive medium are received by said photosensor.

* * * * *